Figure 1:
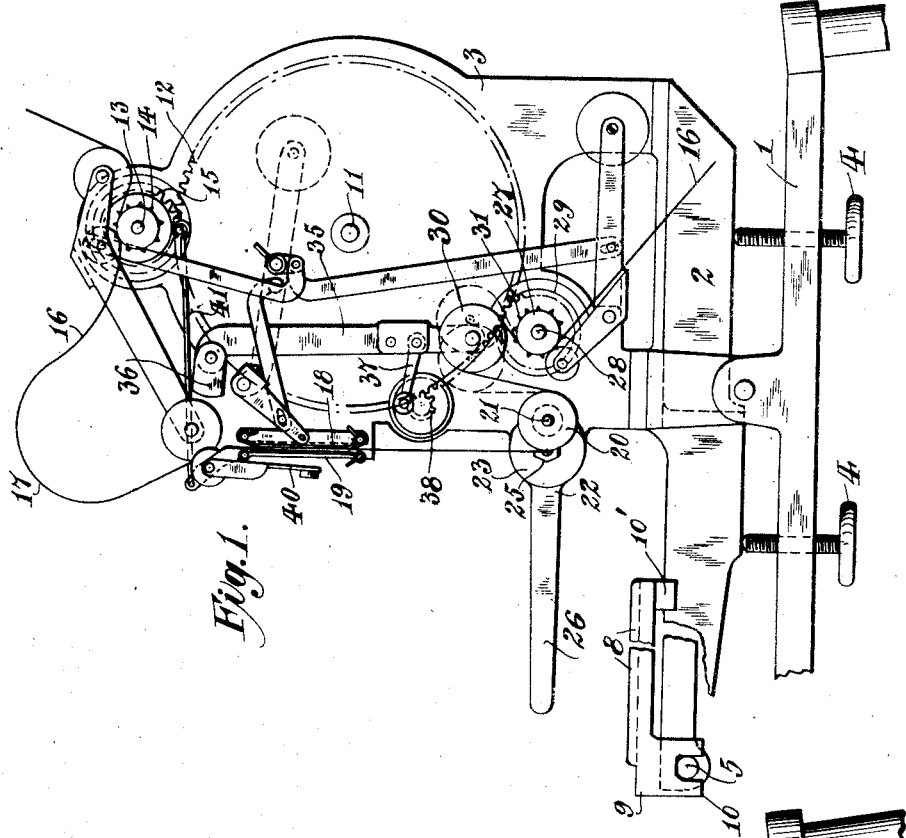

P. F. KRUG.
MOVING PICTURE MACHINE.
APPLICATION FILED JULY 13, 1914.

1,194,753.

Patented Aug. 15, 1916.
2 SHEETS—SHEET 1.

WITNESSES
Geo. Schwarz.
S. A. Thornton.

INVENTOR
Philip F. Krug
BY
W. S. Orton.
ATTORNEY

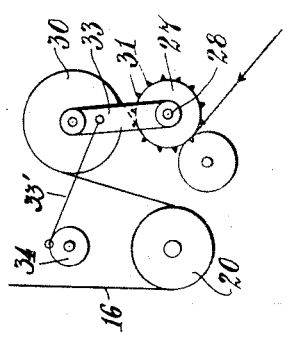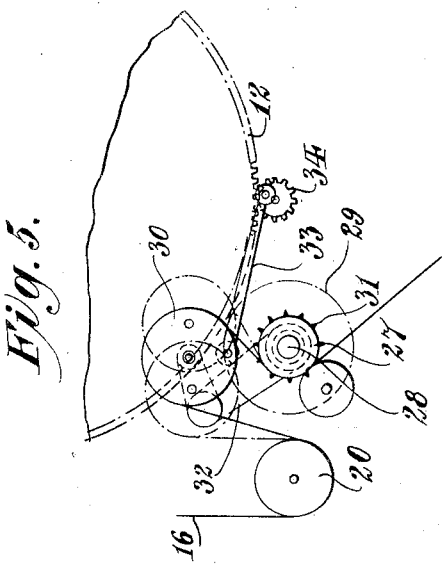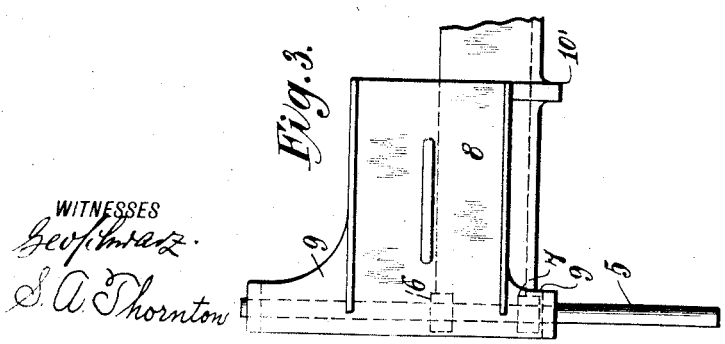

UNITED STATES PATENT OFFICE.

PHILIP F. KRUG, OF NEW YORK, N. Y.

MOVING-PICTURE MACHINE.

1,194,753.

Specification of Letters Patent.  Patented Aug. 15, 1916.

Application filed July 13, 1914. Serial No. 850,535.

*To all whom it may concern:*

Be it known that I, PHILIP F. KRUG, a citizen of the United States, and a resident of the city of New York, borough of Brooklyn, county of Kings, and State of New York, have invented certain new and useful Improvements in Moving-Picture Machines, of which the following is a specification.

My invention relates to a moving picture machine and the primary object of the invention is to simplify the present devices of this character thereby to reduce their cost of construction.

One of the incidental objects of the invention is to provide an improved and simple mechanism to intermittently work the picture film across the picture aperture or optic axis of the machine with the least possible noise.

With this object in view I have provided a film feeding mechanism of a minimum number of inter-engaging parts so arranged that after the back lash necessarily present in machines of this character, has been taken up on the initial movement of the actuating handle, there will be no clicking of engaging parts or other actuation which might produce vibration except for the slight pounding caused by the engaging of the feed and take-up sprockets with the film sprocket holes. With known devices of this character it has been usual to employ beaters, cams or cam-controlled rollers to engage the film intermittently and thus advance the same in operative relation to the picture aperture but these devices intermittently place a severe strain on the film and then release the strain which action usually tears the film especially after it has been in use for a while. Further with these devices it is usual to engage the film by two or three teeth of the take-up sprocket which places too much strain on the limited engaged portion of the film as the same is being drawn across the picture aperture but if the number of engaged teeth be increased to distribute this strain, then the film is continuously curved about a circumference of a sprocket having relatively small diameter, which engagement is unnecessary when the sprocket is merely drawing on the loose loop.

To overcome the above suggested objections, I provide a reciprocating film engaging roller movable across the film path for first wrapping the film about the take-up sprocket in a direction contra to the direction of rotation of the sprocket—that is, if the sprocket is moving clockwise the roller is moved anti-clockwise—thereby to draw an amount of film across the picture aperture in excess of the amount of film drawn by the sprocket while the member is moving in this contra direction. The reciprocating member, in its opposite movement in the same direction of rotation as the sprocket, permits the film to partially unwrap from the sprocket thus permitting the sprocket to take up the surplus amount of film loosened by this partial unwrapping while the loop is in a curve of large radius to prevent transverse cracking of the film.

Another object of the invention is to provide a simple and light form of film framing device which is frictionally locked in position but which can be quickly actuated without affecting any of the film driving mechanism.

Various other objects and advantages will be in part obvious and in part more fully set forth in the following description of a preferred embodiment of my invention which also includes certain new and novel features of construction and combination of parts hereinafter set forth and claimed.

Figure 2:
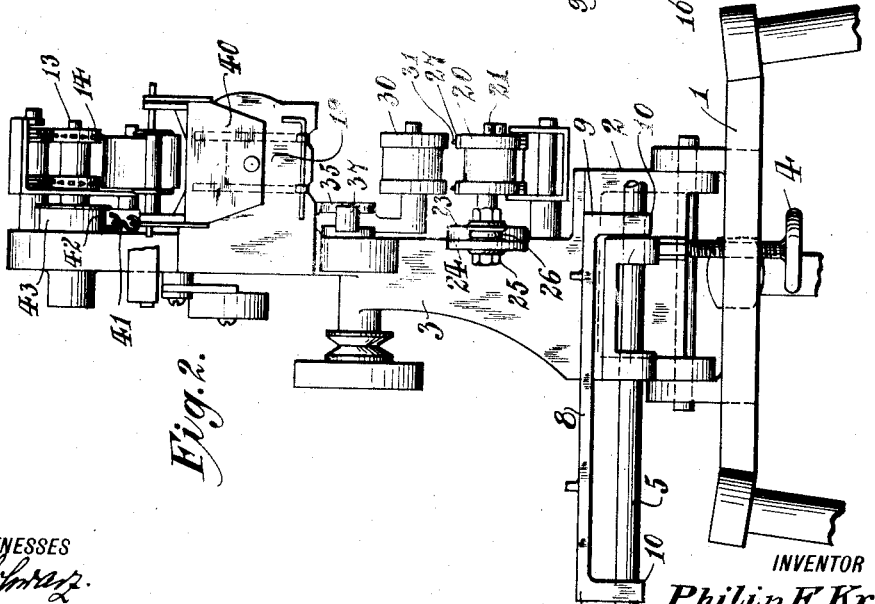

Referring to the accompanying drawings: Figure 1 is a side view of a portion of a moving picture machine showing a preferred embodiment of my invention installed therein, and with parts broken away; Fig. 2 is a rear elevation of the device shown in Fig. 1; Fig. 3 is a plan view of a portion of the lamp-house support; and Figs. 4 and 5 are each side elevations of modified forms of intermittent film feeding mechanisms.

In the drawings there is illustrated a stand 1 to which is pivoted the bed 2 which carries the machine head 3 adjusted vertically by means of the set screws 4. To support the lamp-house (not shown) the bed 2 is extended rearwardly, from the rear portion of which extends a transversely disposed bearing rod 5 having stop nuts 6 and 7. Mounted upon the bed 2 is a lamp carrying plate 8 having laterally extending arms 9 with bifurcated ends 10 bearing upon and straddling the rod 5 and limited in its lateral movement by the stop nuts 6 and 7. The plate 8 may have an additional stop 10' adapted to engage the side of the bed 2 when the lamp is moved out of line of the machine head 3.

The machine head 3 has a main driving shaft 11 driven by any suitable means as by the usual handle and has a relatively large driving wheel 12 mounted thereon. A feed sprocket shaft 13 has a feed sprocket 14 mounted thereon and driven directly from the gear wheel 12 by means of the relatively small gear wheel 15. The film 16 is continuously fed into the upper loop 17 from which it passes through the usual frictional holding means 18 about the picture aperture 19 and is then looped about the framing roller 20 from which it extends about one of the intermittent feeding mechanisms hereinafter described. This roller 20 is freely rotatable about the axis 21 which is eccentrically mounted upon one side of a framing lever 22. This lever has a disk shaped head 23 facing a similarly shaped projection 24 from the head 3 and is held in frictional tight engagement with the projection by means of a horizontally disposed pivot bolt 25. The lever includes a relatively long handle 26 projecting rearwardly from the machine to provide a relatively long sweeping leverage in a vertical plane.

The intermittent film feeding mechanism includes the usual take-up sprocket 27, which sprocket is mounted upon a shaft 28 driven directly from the main driving wheel 12 by means of the gear wheel 29 which has the same number of teeth as the gear wheel 15. The film is locked in position by any suitable means such as the singularly controlled film locking and loop forming device forming the subject matter of my copending application, Serial No. 841191, filed May 27th, 1914. A film engaging roller 30 is mounted for reciprocating movement a slight distance above the take-up sprocket 27 and across the film path. The film extends upwardly from the framing roller 20 and is looped S-shape about opposite sides of the roller 30 and take-up sprocket 27 from which it is trained onto the take-up reel (not shown) as is usual with devices of this character. The roller 30 in its bearing engagement on the film loop moves in a direction contra to the direction of rotation of the sprocket 27 so as to wrap the film partially about the periphery of the sprocket, thereby to engage a greater number of the sprocket teeth 31 than is usually engaged by devices of this character. The reciprocating movement of this roller is preferably in an arc with the axis of the sprocket as a center. As shown in Fig. 5 the roller 30 is mounted upon an extension from a frame 32 rockably mounted upon an extension from the take-up sprocket shaft, which frame is rocked by means of a link 33 pivoted thereto and to an eccentric pinion 34 directly in mesh with the main driving gear 12. In place of the heavy frame 32 the roller 30 may be pivoted to a pair of links 33 supported from the shaft 28 as shown in Fig. 4 and driven by a crank connection 33' with eccentric pinion 34 meshing with the main gear wheel 12. A simpler form of mounting is provided by pivoting the roller 30 at the lower end of a depending arm 35, the upper end of which arm is pivoted to a bracket 36 projecting from the side of the head 3 and the intermediate portion of which is engaged by a link 37 reciprocated by the eccentric pinion 38 driven from the main gear 12.

In operation and with the parts in the position shown in Fig. 1 where the actuating roller 30 is moving toward the left and the film is stationary at the aperture the roller moves into the dotted position shown at the left and the continuously acting sprocket 27 acts on the loosened film to take up the surplus length of film formed by the retreating of the roller 30. In its reciprocating movement in the opposite direction, that is toward the right in Fig. 1, the roller is brought into bearing engagement with the film and this film is not only acted upon by the continuously rotating sprocket but is also acted upon by the roller whereby the film is quickly and easily snapped into its succeeding positions relative to the picture aperture. While the sprocket is merely taking up the surplus loop it is necessary that but one or two of the sprocket teeth engage the film at one time so that when the film is not being drawn as a whole there need be little or no curving of the film around the sprocket. During the time that the take-up sprocket is drawing the portion of the film in advance of the upper loop 17 about the several rollers and through the frictional tight guide-way 18 a severe strain is placed upon this portion of the film particularly where it is engaged by the teeth of the sprocket, but by wrapping the film about the sprocket thereby to bring more teeth into engagement the strain at the sprocket engaged portion of the film is distributed over a longer length of film. While this naturally increases the possibility of forming transverse cracks in the film, the fact that this film is under tension at this time tends to minimize the forming of these cracks. The film is conveniently framed in the picture aperture by a vertical movement of the lever handle 26 by the actuation of which a material leverage is obtained to overcome the frictional tight locking of the framing device and to quickly, yet accurately, frame the film by a thrust or pull in one plane. The framing roller 20 bears on the film in a straight line downward from the aperture plate so that there is a material length of film in the plane of the aperture plate but a relatively short portion of the film is engaged by the frictional holding means at the aperture, thus distributing the pull of the intermittent feed over a relatively long portion of the film.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a moving picture machine, means for feeding the film intermittently across the picture aperture, comprising a take-up sprocket and a pivotally supported member adapted to engage the film on the side thereof opposite the sprocket, said member having a reciprocating movement oscillating about its support over an arc of relatively short radius and across the path of the film substantially in the direction of movement of the sprocket and parallel to and as close as possible to the periphery thereof, whereby said member in its movement in one direction wraps the film partially about the sprocket in a direction contra to the direction of movement of said sprocket to feed a length of film greater than the length taken up by the sprocket during the interval of time when the member is moving in this contra direction and means for actuating said member.

2. In a moving picture machine, means for feeding the film intermittently across the picture aperture, comprising a pair of film engaging members adapted to have the film looped about opposite sides thereof, one of said members being a take-up sprocket and a mounting for the other member rockable about the axis of rotation of the take-up sprocket as a center so that the other member will have a reciprocating movement over an arc described about the axis of rotation of said take-up sprocket and in close proximity to the periphery of the take-up sprocket and reciprocating means engaging said other member to actuate the same.

3. In a moving picture machine, means for feeding the film intermittently across the picture aperture including a take-up sprocket having a line of teeth extending from the periphery thereof to engage the film, a film engaging roller mounted for oscillatory movement in close proximity to the line of teeth on the take-up sprocket, engaging with the film and acting thereon to wrap the film about the sprocket and thus increase the number of sprocket teeth engaging the film during the movement of the same in one direction and for permitting the reducing of the number of engaging teeth during the movement of the roller in the opposite direction and driving means for oscillating said roller and for continuously driving said take-up sprocket.

4. In a moving picture machine, means for feeding the film intermittently across the picture aperture comprising a take-up sprocket continuously acting on the film, retaining means at one side of the sprocket for engaging the film to press the same into engagement with the sprocket and for causing the film to feed from the sprocket at a definite and fixed point, rockably mounted means adapted to engage the film and movable over a line positioned in close proximity to the periphery of the take-up sprocket and curved about said periphery, said means having a movement confined to a position on one side of the tangent to the sprocket at said fixed point, said means having a material movement away from said tangent on the side thereof having the sprocket, whereby said rockably mounted means at its limit of its movement away from the tangent will cause the film to assume a relatively wide angle with said tangent thereby to wrap the film about the take-up sprocket.

5. In a moving picture machine, means for feeding the film intermittently across the picture aperture, comprising a take-up sprocket, a reciprocating member movable across the film path between the picture aperture and take-up sprocket and over an arc curved about the periphery of the take-up sprocket having the axis of rotation of the sprocket as a center and designed so that said arc shall be in close proximity to the periphery of the take-up sprocket, said sprocket and member adapted to have the film looped S-shape about the same and means for reciprocating said member back and forth across the film path.

6. In a moving picture machine, means for feeding the film intermittently across the picture aperture, comprising a feed sprocket, a film engaging roller having a movement circumferentially of said feed sprocket and close to the periphery thereof, means for causing said roller to be moved about the feed sprocket and across the film path adjacent the take-up sprocket and rotary driving means for reciprocating said roller over its guided path.

7. In a moving picture machine, the combination of three film engaging members arranged at the apices of a triangle, one of said members being the take-up sprocket, another of said members being an adjustable roller for varying the relative positions of said members and the other member being a roller for intermittently increasing the length of the film path between the adjustable roller and the take-up sprocket.

8. In a moving picture machine, a support, an adjustable framing roller mounted on said support and movable across the film path, an intermittent film feeding mechanism including said roller, a take-up sprocket and a reciprocating member adapted to engage the film between the take-up sprocket and said roller and movable across the path of said film, the axis of rotation of said sprocket being parallel to the axis of rotation of the roller.

9. In a moving picture machine, means for feeding the film intermittently across the picture aperture, comprising the combination of three film engaging rollers arranged with their axes of rotation parallel to each other at the apices of a substantially equilateral triangle and adapted to have the film trained S-shape about the same, said rollers having relatively large diameters compared to the triangle formed by said members, the intermediate roller in the train, which member engages the film between the other two members, having a reciprocating movement in an arc of relatively short radius across the film path with the center of the arc coinciding with the axis of rotation of the last roller of the train thereby to vary the length of the film between said other two members sufficient to advance the film the requisite distance with a relatively short movement along the arc and means for actuating said intermediate member.

Signed at Ridgewood in the county of Queens and State of New York this 11th day of July, A. D. 1914.

PHILIP F. KRUG.

Witnesses:
RUDOLPH C. GOENNEWICH,
W. S. ORTON.